United States Patent [19]

Wuerflein

[11] 4,266,809
[45] May 12, 1981

[54] OUTRIGGER FLOAT PAD ASSEMBLY

[75] Inventor: James G. Wuerflein, Winona, Minn.
[73] Assignee: Burro-Badger Corporation, Winona, Minn.
[21] Appl. No.: 972,698
[22] Filed: Dec. 26, 1978
[51] Int. Cl.³ .............................................. B60S 9/02
[52] U.S. Cl. ................................. 280/766; 248/677; 254/101; 254/DIG. 1; 403/336
[58] Field of Search ................................. 280/763–766; 212/145; 248/188.8, 677; 254/DIG. 1, 101; 403/336, 335, 379, 361

[56] References Cited

U.S. PATENT DOCUMENTS

| | | | |
|---|---|---|---|
| 1,272,110 | 7/1918 | Robinson | 212/145 X |
| 2,672,243 | 3/1954 | Marsh | 254/101 |
| 3,500,660 | 3/1970 | Anderson | 403/336 X |
| 3,541,835 | 11/1970 | Hunnicutt | 254/101 X |
| 4,118,054 | 10/1978 | Vigerie | 280/765 |
| 4,120,175 | 10/1978 | Dernedde | 403/336 X |

FOREIGN PATENT DOCUMENTS 118770  5/1947  Sweden .................................... 280/763

Primary Examiner—John J. Love
Assistant Examiner—Donald W. Underwood
Attorney, Agent, or Firm—Charles F. Pigott, Jr.

[57] ABSTRACT

An improved float pad mounting is disclosed for releasably connecting the float pad to an outrigger lift jack shaft. The lift jack can be activated to move the shaft between a retracted position for outrigger travel and extended positions grounding the float pad for stabilized outrigger support. The float pad has a base of large area and a central hub upstanding from the base. Cooperating hemispherical surfaces are formed between the shaft and the hub which become engaged in the extended positions to transmit the outrigger load to the float pad base. An annular collar surrounds the shaft, and a pin extended through aligned openings in the collar and shaft secures the collar to the shaft at a location slightly above the load transmitting surface. Two closed links are loosely connected to the collar at 180° spacings around the center axis of the shaft, and two lugs are formed on the float pad hub at like 180° spacings around said hub. Each respective link is adapted, with the load carrying surfaces engaged, to fit over one of said lugs to allow for the link connection to or separation from said lug. Hairpin means releasably fit through an opening in each lug outboardly of said link from said hub and preclude accidental separation of the positioned link from the lug. Each lug has a recessed lower edge facing the base which abuts the link when the load engaging surfaces are separated incidental to the shaft being retracted.

11 Claims, 5 Drawing Figures

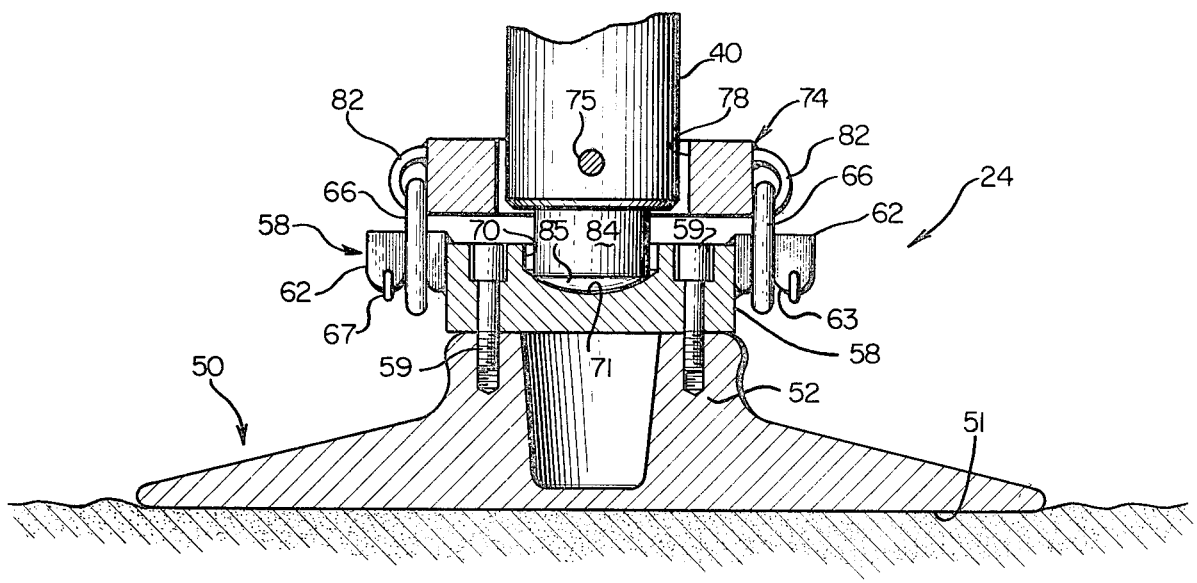
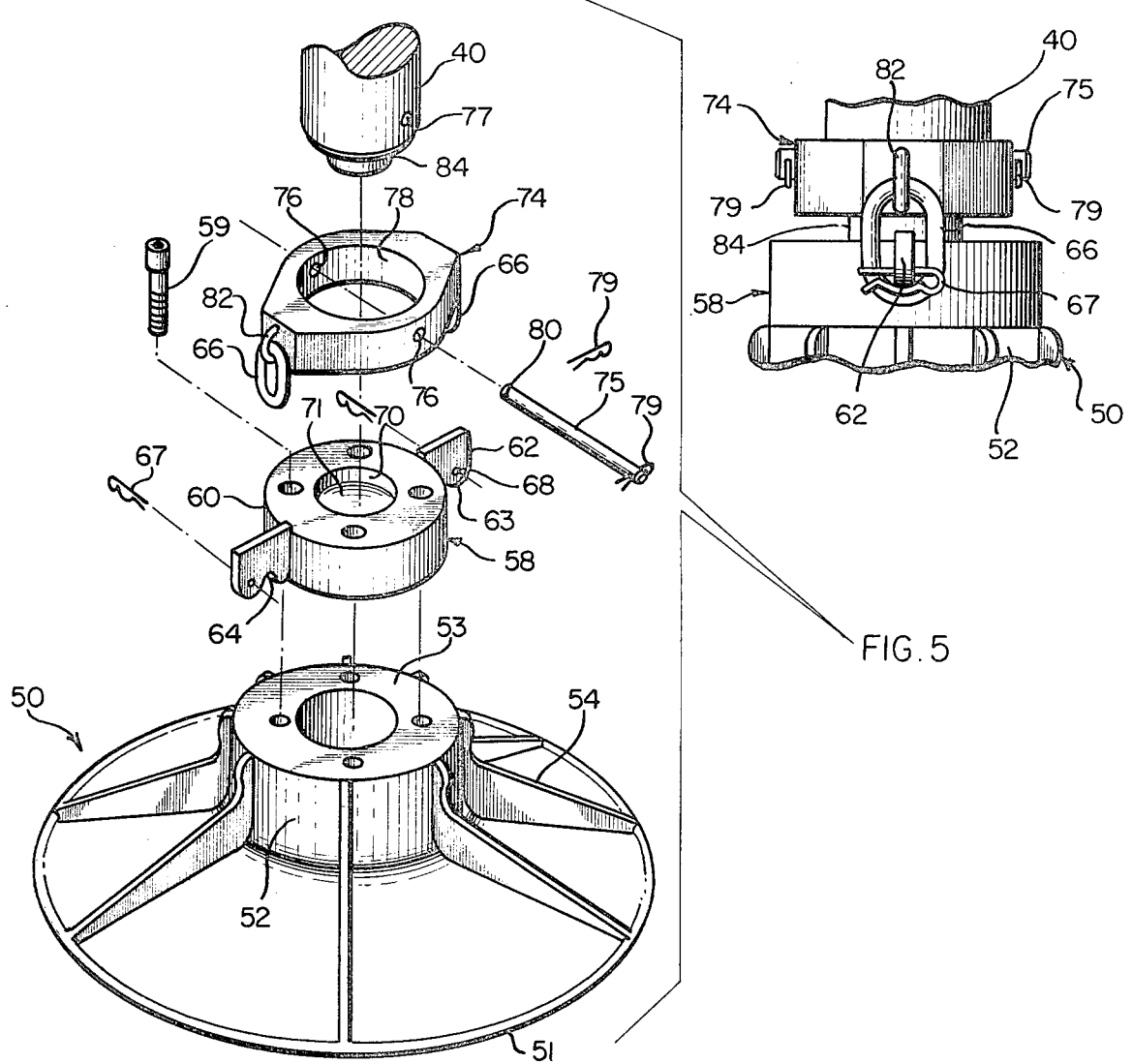

OUTRIGGER FLOAT PAD ASSEMBLY

BACKGROUND OF INVENTION

Many heavy duty mobile construction vehicles, such as mobile cranes having booms extendable to in excess of 100 feet, are supported on wheels or tracks of 8 to 10 feet lateral spacing. Under such circumstances, it is mandatory for the stability of the unit in manipulating heavy loads to provide outriggers that can be extended to well beyond the vehicle width, frequently to support spacings in excess of 15 or 20 feet. Generally, four outriggers are used, located at the four corners of the vehicle.

In one type of outrigger construction commonly in use, four telescoping beams are supported crosswise to the normal vehicle travel, or the narrow dimension of the vehicle in side-by-side relation with two beams at the front of the vehicle and two beams at the rear of the vehicle. The beams when retracted to the vehicle travel positions extend only to the normal sides of the vehicle. Power cylinders connected between the vehicle body and the beams allow for powered beam movement between the retracted and extended beam positions. There further is located at the free board end of each beam a jack cylinder mounted to move its piston or shaft in a vertical direction. A float pad is secured to the lower end of the jack cylinder shaft and frequently is in excess of two feet in diameter to provide a large support area against the underlying ground. Actuation of each jack cylinder thereby presses its float pad against the ground and lifts the vehicle to the extent required, even to where the tires may be elevated off the ground. The outriggers thereby virtually support the vehicle and any load that is picked up by the vehicle.

Because of the desire to provide the furtherest extension for the float pads crosswise or laterally of the vehicle travel, the jack cylinders nest against the outer edges of the vehicle in the beam retracted positions, thereby allowing for normal clearance between the road and surrounding obstacles. To maintain this clearance, it is necessary to remove each float pad from its jack cylinder shaft for vehicle travel on highways or the like.

Because of the relatively large size and gauge of the float pad, it can be quite heavy, rendering complicated assemble and disassemble procedures somewhat difficult and undesirable. One very attractive feature of these mobile construction vehicles is the mobility of the unit itself accompanied further by the ease for setting up and dismanteling the unit before and after the actual work.

Further, not only must the outrigger components be readily assembled and disassembled for mobile use, but they must be fabricated in such a manner that they are somewhat immune to damage during normal use. In as much as the outriggers support the vehicle plus any load that may be lifted by the work unit, very heavy duty gauges and constructions are employed. For example, it would not be uncommon to use bolts no smaller than $\frac{1}{2}$ inch in diameter and further to have lift jack cylinders each with effective lifting capacity in excess of 40 or 50 tons. Moreover, should the inevitable damage occur to any component, it is desirable to provide that it might be readily replaced with a minimum effort.

SUMMARY OF INVENTION

This invention pertains to an improved outrigger assembly for use in over the road construction vehicles or the like for stabilizing the vehicle in operative use, and particularly to the connection between the lift jack cylinder shaft and its float pad.

A specific object of this invention is to provide a mounting connection between the float pad and lift jack cylinder shaft that can withstand tremendous forces normally encountered between the outrigger components, while yet further allowing for the ready assembly or disassembly of the components even by a single person during the normal use of the outrigger, and while yet further allowing for complete easy replacement or repair of the components should bending or other possible damage occur to the components.

DESCRIPTION OF THE DRAWINGS

FIG. 3 is a sectional view as seen generally from line 3—3 of FIG. 2, except further showing the components assembled and in a bottomed load carrying position;

FIG. 4 is a partial side elevational view of the components of FIG. 3; and

FIG. 5 is an exploded perspective view of the mounting components used in the lift jack float pad assembly of the disclosed outrigger.

DETAILED DESCRIPTION OF THE INVENTION

Figure 1:
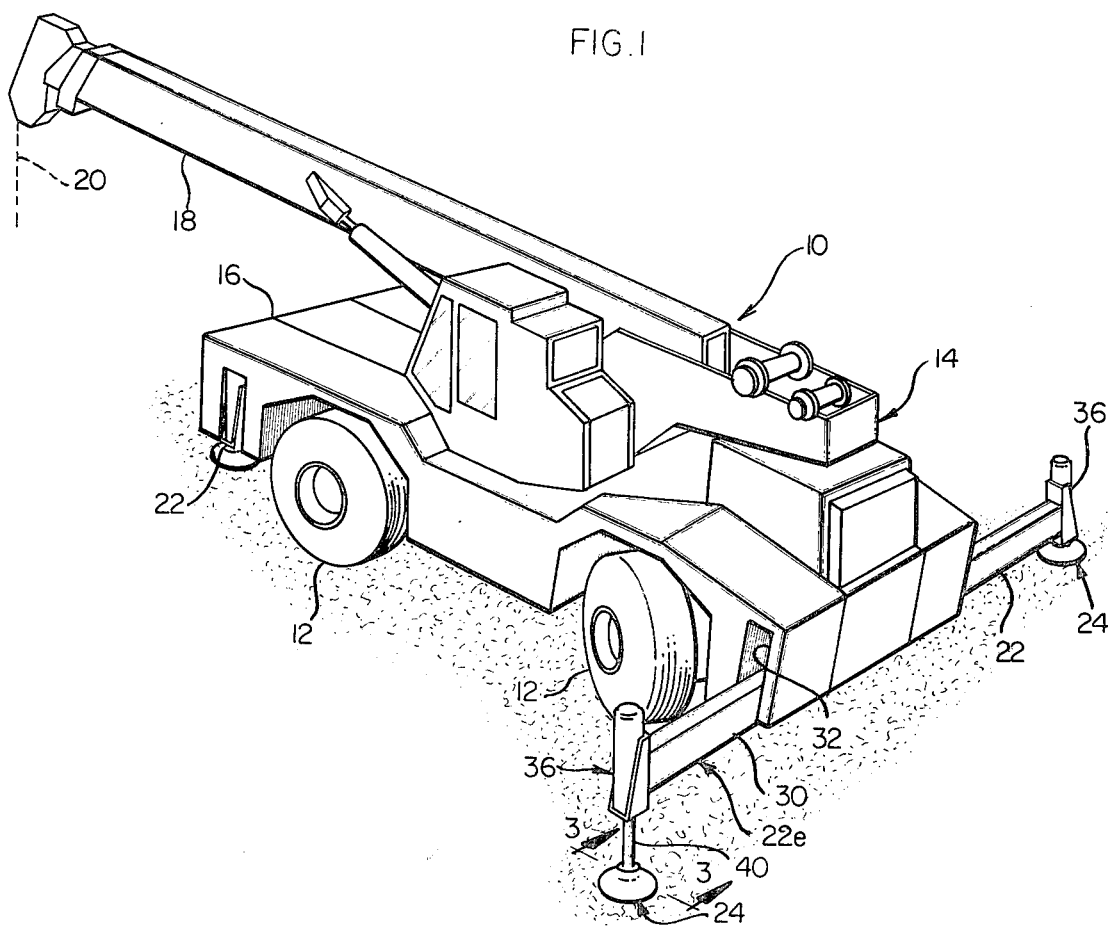
FIG. 1 is a perspective view of a typical overland vehicle to which this outrigger invention can be readily applied, the Figure illustrating certain outriggers retracted to a vehicle travel configuration and certain other outriggers fully extended to the outrigger stabilizing configuration grounded against the underlying support.

FIG. 1 illustrates an overland vehicle 10 supported on wheels 12 and further having a crane 14 supported operatively upon vehicle body 16. Suitable power means (not shown) are provided on the vehicle to power and steer the wheels to allow mobile vehicle travel over terrain including roads to bring the vehicle to the site of proposed use. The crane 14 has a telescoping boom 18 that can bring a lift line 20 well beyond the peripheral edge of the vehicle 10 and particularly beyond the ground support of the four wheels 12.

Four outriggers 22 are provided, two each adjacent the front and rear of the vehicle and are suited to move laterally of the vehicle at the four corners. The laterally spread outriggers 22 define four widely spaced supports, typically in the form of float plates 24 which bear against the ground with sufficient force to remove from the wheels most if not all of the weight of the vehicle and load carried by the vehicle.

The outriggers 22 illustrated each consist of a tubular beam 30 telescoped within appropriate vehicle body structure 32 to extend and move transverse to the direction of normal vehicle travel. The beam can be moved between a completely retracted position (illustrated at 22r in FIG. 1) normally within the confines of the vehicle body 16 and a fully extended position (illustrated at 22e in FIG. 1) where at the free board end of the beam is laterally spaced well beyond the normal wheel support of the vehicle. A power cylinder (not shown) connected between the vehicle body support 32 and each beam itself 30 is used to move the beam between the extended and retracted positions.

As illustrated, a lift jack power cylinder 36 is secured to the free board end of the beam and has a shaft 40 which protrudes from the lower end of the cylinder and is connected to the float pad 24. A piston (not shown) secured to the shaft fits within the cylinder and defines expansible chambers in the cylinder between the piston and the opposite ends of the cylinder. Suitable valve control means (not shown) are used to regulate the passage of hydraulic fluid between a source of pressure and either expansible chamber for moving the piston and connected shaft to a shaft retracted or shaft extended position. For example, when the upper chamber is connected to the high pressure source of the hydraulic fluid, the piston is caused to move downwardly within the cylinder to extend the shaft 40 and cause the shaft supported float pad 24 to bottom against the underlying support or ground (see FIG. 3), and is sufficient power and stroke are available, to ultimately lift the vehicle wheels from contact with the ground. Normally, the lift jack power cylinder shaft is maintained at right angles or normal to the beam.

Specific details of the beam construction and its mounting and moving means, or of the lift jack cylinder and its operation are not of concern herein since any typical traverse beam system well known in the art would be adequate for effectively practicing the disclosed invention.

Figure 2:
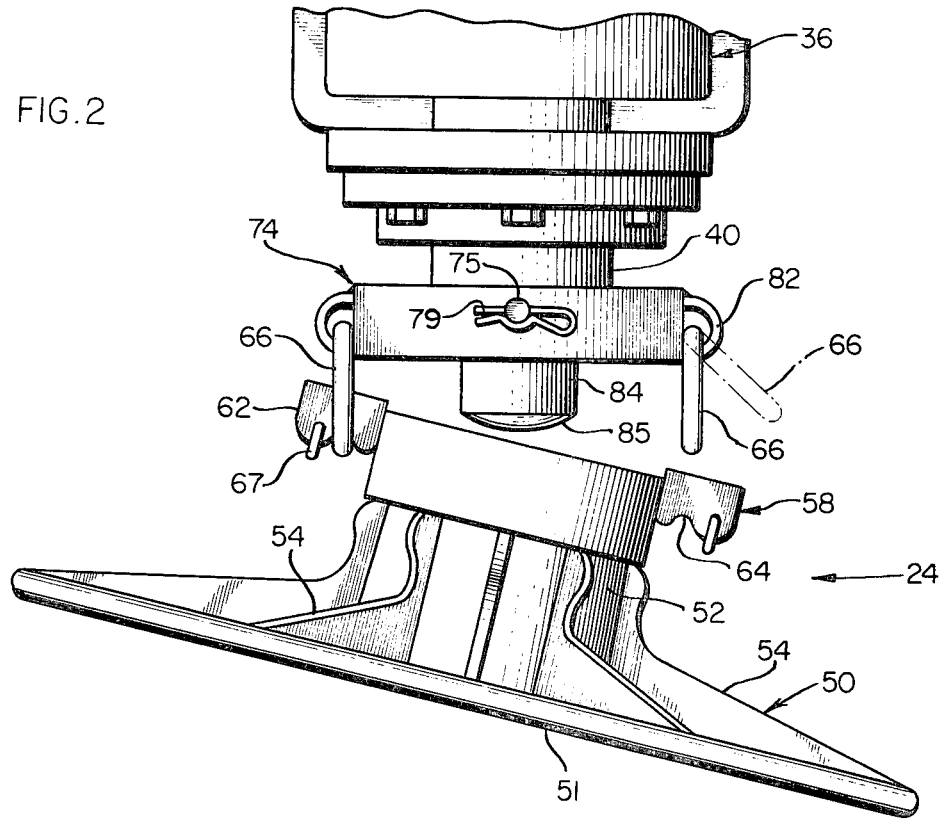
FIG. 2 is an elevational view of the float pad-jack shaft mounting used in FIG. 1, showing the same slightly enlarged and in a partly preassembled relationship.

This invention relates to the releasable connection of the float pad 24 to the lower end of the lift jack shaft 40. The details of the same are shown in FIGS. 2, 3 and 4.

The float pad assembly 24 includes a pad member 50 having a generally planar base 51 and an upstanding centrally located hub 52 ending at a top surface 53 generally parallel to the base 51. Reenforcing webs 54 are radially located between the hub and the base to add lateral stability to the hub while yet maintaining a reasonably light but durable pad member 50. A pad coupling weldment 58 is rigidly secured to the hub 52 by four equally spaced bolts 59 threaded into taps formed through the top surface 53 and thus is in effect a vertical extension of the hub. The weldment includes generally cylindrical member 60 having a pair of lugs 62 welded at 180° spacings to the opposite edges thereof. The bottom surface 63 of each lug is curved to form a recess or slot 64 for receiving and laterally holding a link 66, as will be noted. A hairpin 67 or other locking means is adapted to be fitted through lug opening 68 located outwardly of the slot 64, which thereby serves to trap the link 66 when in place on the lug. The cylindrical member 60 has a cylindrical counter bore 70 which terminates at concave hemispherical surface 71.

The lower or free end of the shaft 40 has an annular collar or shaft weldment 74 secured thereto by means of a pin 75 extended through aligned holes 76 and 77, respectively, formed in the collar and the shaft. The collar or shaft weldment is generally elongated in shape and has a cylindrical through bore 78 which is slightly larger than the lift jack shaft 40. To maintain the pin in place, a pair of hairpins 79 or other locking means are adapted to be fitted through openings 80 at each end of the pin 75 that protrude beyond the outer edges of the collar. An eyelet ring 82 is welded to each elongated edge of the collar at 180° spacing. Each link 66 is trapped or confined on the eyelet ring in a loose fitting manner so that the link can be swung or pivoted between various positions relative to the eyelet ring.

The lower end 84 of the shaft 40 is reduced in size and the lower or end face is formed with hemispherical convex surface 85, which spherical surface corresponds exactly in curvature to the concave surface defined at 71 within the pad coupling weldment or hub extension.

The preferred design provides that the bore 78 of the collar is somewhat larger than the shaft to allow the collar to be easily fit over the shaft. This also is true concerning a preferred loose fit of the pin 75 relative to the slightly larger through holes 76 and 77 defined, respectively, in the weldment collar member and the shaft. Consequently, the components can be readily assembled together, and separated apart if required to replace any of these components, and critical manufacturing tolerances or the like need not be maintained.

To set up the outriggers 22 for use after the vehicle has reached its site of operation, the float pad assemblies would be set on the ground and the hairpins would be removed from their nonuse position in lug openings. The beam also would be extended somewhat as would be lift jack cylinder shaft. This exposes the adaptor or collar 74. By raising the float pad 50, one link 66 can be provided over the lug 62 on one side of the float pad and become laterally confined on the recessed lower edge 64 of the lug (see FIG. 2). The opposite side of the float pad 50 would then be raised to bring the other lug 62 up beyond the other link 66, which link would in turn be moved over the protruding lug (see FIG. 3). The hairpins 67 would be reinstated into the lug openings 68 to keep the links from accidentally becoming unhooked from the lugs. Inasmuch as there typically would be four outriggers 22 used on a vehicle at any one time, this same procedure would have to be repeated for each of the separate outriggers.

When the links 66 are trapped in place on the lugs 62, they are sized to suspend the float pad assembly 24 from the elevated or partially retracted lift jack shaft 40. This allows a slight separation between the complementary hemispherical surfaces 85 and 71 of the shaft and of the float pad respectively, although the protruding end 84 of the shaft is normally confined within the cylindrical bore 70 of the pad coupling weldment 58. Extension of the jack shaft and bottoming of the float pad against the ground causes the two hemispherical surfaces 71 and 85 to engage, the continued extension of the cylinder 36 thereby transmits all lifting forces generated between the cylinder and float pad through those mating surfaces 85 and 71. Further, the cylindrical bore 70 is slightly larger than the shaft section 84 to allow any misalignment between the longitudinal center axis of the shaft 40 and the cylindrical bore, which bore extends in the direction normal to the base 51 on the float pad member 50. Consequently, should the lift jack assembly be used on a grade that is not exactly level, the base can be rotated somewhat relative to the normal axis of the lift jack shaft itself, while the load is yet transmitted through the fully mated hemispherical surfaces 71 and 85.

In order to remove a positioned float pad assembly 24 from cooperation at the lower end of the shaft 40, one need merely remove the pin 67 from the opening 68 of the lugs 62 and thereafter cant one link 66 one at a time to move it out beyond the free end of the lug to release it from the lug. This can be performed quite readily by one person since the tolerance of fit between the components again is rather generous and thereby extreme care or precision of alignment need not be used. When the one link 66 is released from its lug 62 and the float pad assembly 24 is free to pivot about the remaining supporting link 66 (as seen in FIG. 2), the operator need then only lift the pad assembly 24 to work the opposite link free also. The links 66 remain trapped in the eyelet rings 82 when the float pad assembly 24 is separated from the shaft 40. When the float pad assembly 24 is removed from the lift jack shaft 40, the beam 22 can be fully retracted by the power cylinder to position the lift jack cylinder 36 in its outrigger or vehicle travel position. The removed float pad assembly is generally stored during its nonuse, such as for vehicle travel, in compartment (not shown) formed on the vehicle body 16.

The disclosed float pad mounting is durable in use, since all heavy outrigger loads are taken up across mating hemispherical surfaces on structural components that are stacked solid one to the other. Further, the tolerances or clearances between the mating parts are quite generous or large so that there typically is no problem in lining up and assembling mating parts or in removing the parts, even if they are bent or damaged and should be or are being replaced. The connecting link means 66 permanently secured to the shaft collar 74 need only be slipped over the pad coupling member lugs 62 to join the float pad assembly 24 and shaft 40 together in operative association. The hairpins 67 when readily inserted in place prevent accidental separation of these components during normal use.

It is apparent that the links 66 could be secured by eyelet rings to the pad hub weldment or coupling member 58, adapted then to be pivoted over and trapped laterally on lugs 62 in turn formed on the shaft weldment or coupling member 74. However, such a configuration would be disadvantageous in that the assembler of the float pad would have to hold the float pad and simultaneously maneuver the link over the stationary lug 62 on the shaft coupling. In the illustrated configuration, the assembler can lift the float pad assembly 24 and maneuver the lug 62 through the link 66 hanging from the shaft coupling 74, which can easily be done by one person. Note also, the shaft weldment or coupling 74, when secured in place on the shaft 40, becomes a part thereof and moves with the shaft, although it is pivotable about the pin 75; while likewise, the pad hub weldment or coupling 58, when secured to the float pad 50 becomes a part thereof so as to comprise the float pad assembly 24.

What is claimed is:

1. For use with an outrigger lift jack having a shaft adapted to be connected to a float pad, an improved mounting for releasably connecting the float pad to said shaft, comprising the combination of said float pad having a base and hub means upstanding from the base, cooperating surfaces formed between the shaft and the hub means and adapted when engaged to transmit the outrigger load from the lift jack shaft to the float pad, coupling means on the shaft, at least two apertured link means each sized to extend between the coupling means and the hub means, means swingably connecting said apertured link means at spaced locations around the center axis of the shaft to one of the coupling or hub means, whereby each respective link means is adapted to swing adjacent the other of the coupling or hub means when the load transmitting surfaces are engaged, and at least two projecting means on the other of the coupling or hub means which each removably projects into an aperture in a corresponding link means to releasably trap said adjacent link means when the load transmitting surfaces are separated incidental to the shaft being retracted for outrigger travel, whereby the link means then suspend the float pad from the shaft.

2. A float pad-shaft mounting according to claim 1, further including pin means releasably attached to each of said other of the coupling or hub means outboardly of said link means for precluding accidental separation of the link means from the other means when the load transmitting surfaces are engaged.

3. A float pad-shaft mounting according to claim 1, wherein said other of the coupling or hub means has lugs formed thereon over which the link means can be swung, and wherein said trapping means include a recessed surface on each of the lugs facing away from the one of the coupling or hub means.

4. A float pad-shaft mounting according to claim 1 wherein said coupling means is in the form of a collar having an oversized bore fitted over the shaft, and wherein the link means are connected to said collar by eyelet ring means on said collar.

5. A float pad-shaft mounting according to claim 4, wherein said collar is secured to said shaft by a pin extended through aligned oversized holes formed in the shaft and collar.

6. A float pad-shaft mounting according to claim 5, wherein hairpin means extend through oversized holes formed in the pin at the ends thereof that protrude beyond the collar.

7. A float pad-shaft mounting according to claim 1, wherein said cooperating surfaces include a convex hemispherical surface formed on the free end of the shaft and complementary concave hemispherical surface formed on the hub means and facing away from the base.

8. A float pad-shaft mounting according to claim 7, wherein said hub means includes an open top bore that terminates at its lower end at said concave face, and wherein said bore is sized larger than the shaft adapted to freely receive the shaft and allow slight canting of the shaft relative to the base when said cooperating surfaces are engaged.

9. A float pad-shaft mounting according to claim 8, wherein said hub means extends axially of the shaft at said open top bore a distance sufficient to surround and receive said shaft even when the cooperating surfaces are separated and the float pad is suspended on the link means.

10. A float pad-shaft mounting according to claim 9 wherein said coupling means is in the form of a collar having an oversized bore fitted over the shaft, wherein the link means are connected to said collar by eyelet ring means on said collar, wherein said hub means has fixed projecting lugs formed thereon over which the link means swing, and wherein said trapping means include a recessed surface on each lug facing away from the collar.

11. A float pad-shaft mounting according to claim 10, further including means releasably attached to each lug outboardly of said link means for precluding accidental separation of the link means from the lugs even when the load transmitting surfaces are engaged.

* * * * *